United States Patent [19]
Ishii et al.

[11] 3,897,396
[45] July 29, 1975

[54] WITH SUBSTITUTED BENZOIC ACID CATALYSTS ACCELERATING THE CURE OF POLYURETHANEUREAS

[75] Inventors: Michio Ishii; Yoji Watabe; Yutaka Iseda, all of Tokyo, Japan

[73] Assignee: Bridgestone Tire Company Limited, Tokyo, Japan

[22] Filed: Oct. 30, 1974

[21] Appl. No.: 519,194

[52] U.S. Cl. ............... 260/75 NB; 260/75 NH; 260/77.5 AB; 260/77.5 AM; 260/77.5 CR
[51] Int. Cl. ............................................. C08g 22/34
[58] Field of Search ... 260/2.5 AB, 75 NB, 77.5 AB

[56] References Cited
UNITED STATES PATENTS

| | | | |
|---|---|---|---|
| 3,320,190 | 5/1967 | Allpert et al. | 260/2.5 AC |
| 3,511,814 | 5/1970 | Ogura et al. | 260/2.5 AM |
| 3,789,045 | 1/1974 | Coury et al. | 260/75 NB |

FOREIGN PATENTS OR APPLICATIONS

| | | | |
|---|---|---|---|
| 1,053,383 | 12/1966 | United Kingdom | 260/77.5 AB |

OTHER PUBLICATIONS

Saunders et al. – Polyurethanes Part I, Interscience, N.Y. (1962), pages 211–217. Call No. TP986. P6S3.

*Primary Examiner*—H. S. Cockeram
*Attorney, Agent, or Firm*—Brooks Haidt Haffner & Delahunty

[57] ABSTRACT

The cure rate of polyurethaneurea reaction mixtures is accelerated by the use of alkyl and/or alkoxyl substituted benzoic acids. Improvement in demolding time is achieved without reducing pot-life.

16 Claims, No Drawings

WITH SUBSTITUTED BENZAIC ACID CATALYSTS ACCELERATING THE CURE OF POLYURETHANEUREAS

BACKGROUND OF THE INVENTION

1. Field of the Invention

The present invention relates to a method of enhancing the cure rate of a polyurethaneurea reaction mixture to make the demolding time of the resulting polyurethaneurea shorter effectively.

2. Description of the Prior Art

In general concept, organic carboxylic acids have been known to promote the reaction of an isocyanate group with an amino group to form a substituted urea group. Dicarboxylic acids such as adipic acid and azelaic acid are well-known typical promoters for the aforementioned reaction. However, a novel catalyst having a higher catalytic activity than the known promoters has been expected to be presented, because a shorter demolding time attained by a higher catalytic activity affords an economical merit in a production process of the molded polyurethaneurea, and because a smaller quantity of the catalyst required to promote the curing results in the decrease of side-reactions caused by the active hydrogen of the carboxylic group of the catalyst.

SUMMARY OF THE INVENTION

The present invention provides a method of accelerating the cure rate of a polyurethaneurea reaction mixture, comprising forming a prepolymer by reacting an excess of an organic polyisocyanate with a hydroxyl containing compound of 500 to 30,000 molecular weight selected from the class consisting of polyether polyols, polyester polyols, and hydrocarbon polyols, mixing the prepolymer with an organic polyamine curative and an accelerating amount of a catalyst selected from the class consisting of alkyl and alkoxyl substituted benzoic acids shown by the formula

(wherein R is selected from the class consisting of alkyl or alkoxyl group having 1 to 4 carbon atoms, $n$ is an integer of 1 to 3, and R may be similar or dissimilar when $n$ is 2 or 3), and curing the polyurethaneurea reaction mixture.

An object of the present invention is to shorten a demolding time of a cured polyurethaneurea.

Another object of the present invention is to shorten the demolding time of the cured polyurethaneurea without shortening the pot-life of a reaction mixture.

A further object of the present invention is to shorten the demolding time of the resulting cured polyurethaneurea without shortening the pot-life of the reaction mixture and deleteriously affecting the physical properties of the resulting cured polyurethaneurea.

DESCRIPTION OF THE PREFERRED EMBODIMENTS

Typical examples of the catalyst, alkyl and/or alkoxyl substituted benzoic acid are selected from the class consisting of 2-methyl benzoic acid, 3-methyl benzoic acid, 4-methyl benzoic acid, 2,3-dimethyl benzoic acid, 2,4-dimethyl benzoic acid, 3,4-dimethyl benzoic acid, 3,5-dimethyl benzoic acid, 2,5-dimethyl benzoic acid, 2,6-dimethyl benzoic acid, 2,4,6-trimethyl benzoic acid, 2,3,4-trimethyl benzoic acid, 2,3,5-trimethyl benzoic acid, 3,4,5-trimethyl benzoic acid, 2,3,6-trimethyl benzoic acid, and other alkyl and/or alkoxyl substituted benzoic acids wherein all or a part of the methyl groups of said methyl substituted benzoic acids are substituted by a group selected from the class consisting of ethyl, n-propyl, iso-propyl, n-butyl, iso-butyl, tert-butyl, methoxyl, ethoxyl, n-propoxyl, iso-propoxyl, n-butoxyl, iso-butoxyl, and tert-butoxyl.

The catalysts are preferably 2-methyl benzoic acid, 3-methyl benzoic acid, 4-methyl benzoic acid, 3,5-dimethyl benzoic acid, 4-methoxy benzoic acid, 3,4-dimethoxy benzoic acid, 2-ethoxy benzoic acid, 4-ethoxy benzoic acid, and 3,4,5-trimethyl benzoic acid.

The amount of the catalyst used in accordance with this invention can vary from 0.1 to 4.0 millimoles per hundred grams of the prepolymer in the reaction mixture. The demolding time is shortened by increasing the amount of a catalyst used. However, the catalyst of more than 4.0 millimoles does not shorten the demolding time effectively, but conversely shortens the pot-life remarkably and deleteriously affecting the physical properties of the resulting cured polyurethaneurea.

The catalyst is usually dissolved in the polyamine. It also may be dissolved in the prepolymer.

The catalyst of the present invention promotes fundamentally the reaction between an isocyanate group and an amino group, and is not restricted by the nature of the structures of the prepolymer and the polyamine. The prepolymers used in the present invention may be prepared by the well-known methods. For example, said prepolymer may be prepared by reacting an excess of an organic polyisocyanate with a hydroxyl containing compound such as a polyether polyol, polyester polyol, polydiene polyol, and analogues thereof.

The weight average molecular weight of said hydroxyl containing compound is 500 to 30,000, and is preferably 800 to 20,000.

Representative polyether polyol is a polyether having terminal hydroxyl groups for example, polyalkylene oxides such as polyethylene oxide, polypropylene oxide, polybutylene oxide, polyamylene oxide, and analogues thereof, polyepihalohydrins such as polyepichlorohydrin, polyaralkylene oxides such as polystyrene oxide, and analogues thereof, polyhydroxylic polyalkylene ethers such as polytetramethylene glycol, copolymers of said oxides and tetrahydrofuran and polyacetals prepared by condensation of butenedioxyethyl glycol or diethylene glycol with formaldehyde. The preferred polyether polyols are polytetramethylene glycol and polypropylene glycol.

The polyester polyol is a polyester having terminal hydroxyl groups, for example, hydroxyesters prepared by reacting polybasic carboxylic acids such as oxalic acid, malonic acid, succinic acid, gultaric acid, adipic acid, pimeric acid, cork acid, azelaic acid, sebacic acid, brassylic acid, fumaric acid, glutaconic acid, α-hydromuconic acid, β-hydromuconic acid, α-butyl-α-ethyl-glutaric acid, α, β-diethyl succinic acid, phthalic acid, isophthalic acid, terephthalic acid, trimellitic acid, trimesic acid, mellophonic acid, prehnitylic acid, pyromellitic acid, benzene-pentacarboxylic acid, 1,4-cyclohexanedicarboxylic acid, 1,3,5-benzene tricarboxylic acid, 3,4,9,10-perylene tetracarboxylic acid or analogues thereof with polyols such as ethylene glycol, propylene glycol, propane-1,2-diol, propane-1,6-diol, allyloxypropane diol, butane-1,4-diol, butane-1,3-diol, butane-2,3-diol, butane-2,4-diol, butanedioxyethyl glycol, butene-1,4-diol, pentane-1,4-diol, pentane-1,5-diol, hexane-1,6-diol, decane-1,10-diol, dodecane-1,12-diol, octadecane-7,18-diol, 4,4'-dihydroxydicyclohexylmethane, 4,4'-dihydroxydicyclohexyldimethylmethane, bis-2-hydroxyethylterephthalate, xylylene glycol, glycerine, castor oil, trimethylol propane, trimethylol ethane, hexane-1,2,6-triol, hexane-1,3,6-triol, saccharoid such as pentaerythritol, sorbitol or mannitol, hydroguinone, 4,4'-dihydroxydiphenylmethane, 4,4'-dihydroxydiphenyldimethylmethane, resorcinol thiodiglycol, glycol and analogues thereof and mixtures thereof, and is preferably dihydroxypolyethylene adipate or dihydroxybutylene adipate. The hydroxypolyesters such as those of the lactone series or lactone copolymer series and polyester ether glycols such as polydiethylene adipate and the like may be used.

The hydrocarbon polyol is a polydiene having terminal hydroxyl groups selected from the class consisting of homopolymers and copolymers of conjugated dienes having 4 to 6 carbon atoms such as polybutadiene polyols, polyisoprene polyols, polychloroprene polyols, polypiperylene polyols, butadieneisoprene copolymer polyols, and the like, copolymers of a conjugated diene and an aromatic vinyl monomer such as copolymer polyols of butadiene-styrene, isoprene-styrene, butadiene-vinyl naphthalene, butadiene-α-methylstyrene, and the like, and copolymers of said conjugated diene and a vinyl nitrile monomer such as copolymer polyols of butadiene-acrylonitrile, isoprene-acrylonitrile, butadiene-α or β-methyl acrylonitrile, and the like, and is preferably polybutadiene glycol, butadiene-styrene, copolymer glycol, or butadiene-acrylonitrile copolymer glycol.

Typical examples of organic polyisocyanate are aromatic polyisocyanates such as tolylene-2,4 and 2,6-diisocyanate 4,4'-diphenyl methane diisocyanate, and ortho-tolidine diisocyanate, alicyclic polyisocyanates such as hydrogenated tolylene-2,4 and 2,6-diisocyanate, hydrogenated xylylene diisocyanate and hydrogenated 4,4'-diphenyl methane diisocyanate, aliphatic polyisocyanates such as hexamethylene-1,6-diisocyanate, and mixtures thereof, and preferably with tolylene diisocyanate.

Representative organic polyamine curative are aromatic polyamines such as 4,4'-methylene-bis-orthochloroaniline, 4,4'-methylene-bis-ortho-methylcarboxylatoaniline, 4,4'-methylene-bis-aniline, 2,6-dichloro-paraphenylene diamine, and preferably with 4,4'-methylene-bis-ortho-chloroaniline.

The chemical equivalent ratio of the amino group of the organic polyamine curative to the isocyanate group of the prepolymer in said polyurethaneurea reaction mixture is preferably from 0.80 to 1.10, and more preferably 0.9 to 1.05.

The curing reaction of said prepolymer with said organic polyamine in the presence of said catalyst of the present invention is preferably carried out at the temperature of 20° to 140°C, and more preferably at 90° to 120°C.

The reaction of said prepolymer with said polyamine in the presence of said catalyst of the present invention may be carried out either in the presence or absence of solvent.

According to the present invention, the demolding time of the resulting cured polyurethaneurea can be shortened by the use of the specified catalyst of the present invention. The same shortened demolding time is attained by using a smaller amount of the catalyst of the present invention than the known carboxylic acid catalyst, mostly without making the pot-life of the reaction mixture shorter and without deleteriously affecting the physical properties of the resulting cured polyurethaneurea.

The wording "pot life" in the present invention is defined to be the space of time between a time-point when the polyurethaneurea reaction mixture is prepared and another time-point when the viscosity of the reaction mixture reaches 10,000 centi-poises at 80°C. The viscosity has been measured by means of the B-type viscometer at 80°C.

The wording "demolding time" in the present invention is defined to be the space of time between a time-point when the polyurethaneurea reaction mixture is poured into a mold and another time-point when it becomes possible to demold the resulting cured polyurethaneurea from the mold without any damage of the shape of the resulting polyurethaneurea article. The curing state of the reaction mixture has been determined by following the torque value by means of the JSR-type curelastometer under the condition of the measuring frequency and angle being 3 rpm and 1°, respectively. It has been confirmed that the demolding time can be represented by the time required to reach a 90 percent torque value of the saturated torque value of the resulting cured polyurethaneurea.

The present invention can be made readily appreciated by reference to the representative examples.

Example 1

To 100 g polytetramethylene glycol of OH-value of 44.5, was added 21.9 g. of tolylene diisocyanate (80/20 mixture of 2,4-/2,6-substituted), and subjected to the reaction under constant mixing at 80°C for 8 hours. The isocyanate content of the resulting prepolymer was determined to be 4.33 percent.

2.06 millimoles of 2-methyl benzoic acid was dissolved in 14 g of 4,4'-methylene-bis-orthochloroaniline (MOCA) at 110°C. This mixture was admixed with 100 g. of said prepolymer, and immediately the resulting mixture was poured into a mold of the curelastometer of 100°C and the torque was continuously measured during the reaction.

The demolding time and the pot-life are as shown in Table 1. The physical properties of the samples of the resulting polyurethaneurea were measured and are also shown in Table 1.

Tensile strength at break ($T_B$ kg/cm$^2$) and Elongation at break ($E_B$ %) of the sample were measured by the Tensilon Universal Tester (UTMI Type, manufactured by Toyo Boldwin Co. LTD). The test piece was prepared by stamping out a ring-like sample from a slub sheet of thickness of 2 mm, and a tension speed of the tester was 50 mm/min.

Comparison Example 1

The experiment was carried out according to Example 1 except that 2-methyl benzoic acid was not used. The results are shown in Table 1.

Comparison Examples 2-3

The experiment was carried out according to Example 1 except that adipic acid or benzoic acid of the well known catalyst was used in place of 2-methyl benzoic acid. The results are shown in Table 1.

Table 1

| Example No. | Catalyst | Concentration of catalyst (Millimol/100g) | Demolding Time | Pot-Life | Properties $T_B$ (kg/cm$^2$) | $E_B$ (%) |
| --- | --- | --- | --- | --- | --- | --- |
| Example 1 | 2-methyl Benzoic acid | 2.06 | 18$^m$.05$^s$ | 4$^m$.58$^s$ | 507 | 562 |
| Comparison Example 1 | none | 0 | 68 .38 | 16 .17 | 462 | 512 |
| Comparison Example 2 | Adipic acid | 2.06 | 25 .0 | 4 .55 | 513 | 526 |
| Comparison Example 3 | Benzoic acid | 2.06 | 25 .0 | 5 .0 | — | — |

Table 1 shows that 2-methyl benzoic acid of the present invention provides shorter demolding time than adipic acid or benzoic acid of the well known catalyst. However, the pot-life provided by 2-methyl benzoic acid is similar to that provided by the well known catalyst, and the properties of the resulting polyurethaneurea are not inferior to those provided by the well known catalyst.

Example 2-8

The experiments were carried out according Example 1 except that various substituted benzoic acids were used in place of 2-methyl benzoic acid. The results are shown in Table 2.

Table 2

| Example No. | Catalyst | Demolding Time | | Pot-Life | |
| --- | --- | --- | --- | --- | --- |
| Example 2 | 3-methyl benzoic acid | 14$^{min.}$ | 49$^{sec.}$ | 4$^{min.}$ | 24$^{sec.}$ |
| Example 3 | 4-methyl benzoic acid | 14 | 37 | 4 | 18 |
| Example 4 | 3,5-dimethyl benzoic acid | 19 | 23 | 4 | 18 |
| Example 5 | 4-methoxy benzoic acid | 15 | 15 | 3 | 43 |
| Example 6 | 3,4-dimethoxy benzoic acid | 14 | 29 | 3 | 56 |
| Example 7 | 2-ethoxy benzoic acid | 21 | 54 | 7 | 14 |
| Example 8 | 4-ethoxy benzoic acid | 19 | 39 | 4 | 21 |

Table 2 shows that demolding times of polyurethaneureas using catalysts of the present invention are shorter than those of polyurethaneureas having the well known catalysts or using no catalyst shown in Table 1.

Example 9

The solution of 3.43 millimoles of 2-methyl benzoic acid in 14.0 g. of methylene bis-orthochloroaniline was mixed with 100 g. of the prepolymer used in Examples 1-8. The resulting mixture was poured into a mold of curelastometer of 100°C and the torque was measured.

The demolding time was 10 minutes and 6 seconds, and the pot-life was 4 minutes and 26 seconds. The tensile strength at break ($T_B$) of the test piece was 441 kg/cm$^2$ and the elongation at break ($E_B$) was 5457.

Comparison Example 4

The experiment was carried out according to Example 9 except that 10.27 millimoles of 2-methyl benzoic acid was used. The demolding time was 8 minutes and 18 seconds, and the pot-life was less than 2 minutes. The tensile strength at break was 244 kg/cm$^2$ and the elongation was 5937 percent.

The above mentioned, result shows that even if a large quantity of the catalyst should be used, the demolding time is not shortened and, on the other hand, the pot-life is shortened resulting in increasing difficulty of processing, and furthermore the tensile strength and elongation decrease.

Example 10

The experiment was carried out according to Example 9 except that 2.06 millimoles of 2-methyl benzoic acid was used and the chemical equivalent of the amine was at the range of 80 – 110.7 percent of the chemical equivalent of the isocyanate group of the prepolymer. The results are shown in Table 3.

Table 3

| Diamines | NH$_2$/NCO | No Catalyst Pot-Life | | Demolding Time | | 2-methyl benzoic acid Pot-Life | | Demolding Time | |
| --- | --- | --- | --- | --- | --- | --- | --- | --- | --- |
| Methylene-bis-ortho-chloroaniline | 0.8 | 24$^{min.}$ | 00$^{sec.}$ | 78$^{min.}$ | 06$^{sec.}$ | 5$^{min.}$ | 48$^{sec.}$ | 30$^{min.}$ | 48$^{sec.}$ |
| " | 1.0 | 20 | 18 | 72 | 54 | 5 | 30 | 21 | 24 |
| " | 1.1 | 18 | 30 | 40 | 54 | 4 | 48 | 13 | 48 |

Table 3 shows that the pot-life obtained by using 2-methyl benzoic acid hardly depends upon —NH$_2$/NCO ratio though the demolding time markedly decreases with the increase in the —NH$_2$/NCO ratio.

Example 11

The experiment was carried out according to Example 9 except that 2.06 millimoles of 2-methyl benzoic acid was used and curing temperatures were 60°, 100° and 120°C.

The results are shown in Table 4

Table 5 shows that the demolding time of the polyurethaneurea using 2-methyl benzoic acid of the present invention is shorter than that of the polyurethaneurea using no catalyst or using benzoic acid of the well known catalyst, and that the pot-life of 2-methyl benzoic acid is similar to that of benzoic acid.

Example 13

17.5 g. of tolylenediisocyanate (80/20 mixture of 2,4-/-2,6-substituted) was added to 100 g. of polyethyl- Table 4

|  | 60°C | | | | 100°C | | | 120°C | | |
|---|---|---|---|---|---|---|---|---|---|---|
|  | Pot-Life | | Demolding Time | | Pot-life | Demolding Time | | Pot-Life | | Demolding Time |
| Control | 21$^{min}$ | 00$^{sec}$ | 136$^{min}$ over | 20$^{min}$ | 18$^{sec}$ | 72$^{min}$ | 54$^{sec}$ | 20$^{min}$ | 00$^{sec}$ | 37$^{min}$ 18$^{sec}$ |
| 2-methyl benzoic acid | 5 | 36 | 83 | 30 | 5 30 | 21 | 24 | 5 | 30 | 13 18 |

Table 4 shows that 2-methyl benzoic acid has the shortening effect at the curing temperatures as shown above.

Example 12

22.8 g. of tolylene diisocyanate (80/20 mixture of 2.4-/2.6-substituted) was added to 100 g. of polypropylene glycol (OH value : 72.7) and was reacted at 80°C for 8 hours. The isocyanate content of the obtained prepolymer was 4.45%. The solution of 0.34 millimoles of 2-methyl benzoic acid in 14.14 g. of methylene-bis-ortho-chloroaniline was added to said prepolymer as a catalyst. The resulting mixture was poured into a mold of curelastometer previously set at 100°C and a torque was continuously measured during reaction.

The results are shown in Table 5.

Comparison Example 5

The experiment was carried out according to Example 12 except that 2-methyl benzoic acid was not used. The results are shown in Table 5.

Comparison Example 6

The experiment was carried out according to Example 12 except that benzoic acid, a well known catalyst, was used in place of 2-methyl benzoic acid. The results are shown in Table 5.

ene adipate glycol (OH value : 55.8), and was reacted at 80°C for 8 hours. The isocyanate content of the obtained prepolymer was 3.57 percent. The solution of 1.03 millimoles of 2-methyl benzoic acid corresponding to the chemical equivalent of carboxyl group in 11.35 g. of methylene-bis-ortho-chloroaniline was mixed with 100 g. of said prepolymer, and the resulting mixture was poured into a mold of curelastometer of 100°C to measure the torque continuously during reaction.

The results are shown in Table 6.

Comparison Example 7

The experiment was carried out according to Example 13 except that 2-methyl benzoic acid was not used. The results are shown in Table 6.

Comparison Example 8

The experiment was carried out according to Example 13 except that benzoic acid, a well known catalyst, was used in place of 2-methyl benzoic acid. The results are shown in Table 6.

Table 5

| Example No | Catalyst | Concentration of catalyst | Demolding Time | | Pot-life | |
|---|---|---|---|---|---|---|
| Example 12 | 2-methyl benzoic acid | 0.34 millimole/100g | 69$^{min}$ | 24$^{sec}$ | 6$^{min}$ | 36$^{sec}$ |
| Comparison Example 5 | none | 0 | 95 | 36 | 10 | 54 |
| Comparison Example 6 | Benzoic acid | 0.34 | 79 | 24 | 6 | 48 |

Table 6

| Example No. | Catalyst | Concentration of catalyst | Demolding Time | | Pot-Life | |
|---|---|---|---|---|---|---|
| Example 13 | 2-methyl benzoic acid | 1.03 millimoles/100g | 36$^{min}$ | 00$^{sec}$ | 6$^{min}$ | 00$^{sec}$ |
| Comparison Example 7 | none | 0 | 94 | 00 | 14 | 54 |
| Comparison Example 8 | Benzoic acid | 1.03 | 39 | 00 | 5 | 36 |

Table 6 shows that 2-methyl benzoic acid of the present invention provides a larger effect of promoting reaction than benzoic acid, the well known catalyst, and that 2-methyl benzoic acid provides a larger pot-life than benzoic acid.

We claim:

1. A method of accelerating the cure rate of a polyurethaneurea reaction mixture, comprising forming a prepolymer by reacting an excess of an organic polyisocyanate with a hydroxyl containing compound having weight average molecular weight of 500 to 30,000 selected from the class consisting of polyether polyols, polyester polyols, and hydrocarbon polyols, mixing the resulting prepolymer with an organic polyamine curative, and an accelerating amount of a catalyst selected from the class consisting of alkyl and alkoxyl substituted benzoic acids shown by the formula

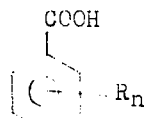

wherein R is selected from the class consisting of alkyl and alkoxyl having 1 to 4 carbon atoms, $n$ is an integer of 1 to 3, and R may be similar or dissimilar when $n$ is 2 or 3, and curing the polyurethaneurea reaction mixture.

2. The method according to claim 1 wherein the amount of catalyst is 0.1 to 4.0 millimoles per hundred grams of the prepolymer.

3. The method according to claim 1 wherein the catalyst is selected from the class consisting of 2-methyl benzoic acid, 3-methyl benzoic acid, 4-methyl benzoic acid, 3,5-dimethyl benzoic acid, 4-methoxyl benzoic acid, 3,4-dimethoxyl benzoic acid, 2-ethoxy benzoic acid, 4-ethoxyl benzoic acid, and 3,4,5-trimethyl benzoic acid.

4. The method according to claim 1 wherein the catalyst is 2-methyl benzoic acid.

5. The method according to claim 1 wherein the organic polyisocyanate is selected from the class of aromatic polyisocyanate, alicyclic polyisocyanate, and aliphatic polyisocyanate.

6. The method according to claim 1 wherein the organic polyisocyanate is tolylene diisocyanate.

7. The method according to claim 1 wherein the polyether polyol is selected from the class consisting of polytetramethylene glycol and polypropylene glycol.

8. The method according to claim 1 wherein the polyester polyol is dihydroxyl polyethylene adipate.

9. The method according to claim 1 wherein the prepolymer is selected from the class consisting of the reaction products of polytetramethylene glycol, polypropylene glycol and dihydroxyl polyethylene adipate with tolylene diisocyanate.

10. The method according to claim 1 wherein the organic polyamine is an aromatic polyamine.

11. The method according to claim 1 wherein the organic polyamine is selected from the class consisting of 4,4'-methylene-bis-ortho-chloroaniline, 4,4'-methylene-bis-ortho-methylcarboxylatoaniline, 4,4'-methylene-bis-aniline, and 2,2',5-trichloro-4,4'-methylene-bis-aniline.

12. The method according to claim 1 wherein the organic polyamine is 4,4'-methylene-bis-ortho-chloroaniline.

13. The method according to claim 1 wherein the chemical equivalent ratio of the amino group of the organic polyamine curative to the isocyanate group of the prepolymer in the reaction mixture ranges from 0.80 to 1.10.

14. The method according to claim 1 wherein the curing temperature ranges from 20° to 140°C.

15. The method according to claim 1 wherein the curing temperature ranges from 90° to 120°C.

16. The method of accelerating the cure rate of a polyurethaneurea reaction mixture, comprising forming a prepolymer by reacting an excess of tolylene diisocyanate with a hydroxyl containing compound having weight average molecular weight 500 to 30,000 selected from the class consisting of polytetramethylene glycol, polypropylene glycol and dihydroxyl ethylene adipate, mixing the resulting prepolymer with 4,4'-methylene-bis-ortho-chloroaniline and a catalyst selected from the class consisting of 2-methyl benzoic acid, 3-methyl benzoic acid, 4-methyl benzoic acid, 3,5-dimethyl benzoic acid, 4-methoxyl benzoic acid, and 3,4-dimethoxyl benzoic acid in the amount of 0.1 to 4.0 millimoles per hundred grams of the prepolymer, and curing the polyurethaneurea reaction mixture at the temperature of 90° to 120°C.

* * * * *

UNITED STATES PATENT OFFICE
CERTIFICATE OF CORRECTION

Patent No. 3,897,396  Dated July 29, 1975

Inventor(s) MICHIO ISHII, YOJI WATABE, YUTAKA ISEDA

It is certified that error appears in the above-identified patent and that said Letters Patent are hereby corrected as shown below:

Front page, after the line "[21] Appln. No.: 519,914" insert

--[30] Foreign Application Priority Data

Nov. 6, 1973 Japan..........123959/1973--

Signed and Sealed this thirtieth Day of December 1975

[SEAL]

Attest:

RUTH C. MASON
*Attesting Officer*

C. MARSHALL DANN
*Commissioner of Patents and Trademarks*